United States Patent
Polkus et al.

(10) Patent No.: US 9,062,615 B2
(45) Date of Patent: Jun. 23, 2015

(54) METHODS AND SYSTEM FOR CONTROL OF A TWO-STAGE TURBOCHARGER

(75) Inventors: Greg Thomas Polkus, Waukesha, WI (US); James Robert Mischler, Lawrence Park, PA (US); Luke Henry, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 13/585,867

(22) Filed: Aug. 15, 2012

(65) Prior Publication Data
US 2014/0047834 A1   Feb. 20, 2014

(51) Int. Cl.
F02B 33/44   (2006.01)
F02D 23/00   (2006.01)

(52) U.S. Cl.
CPC .............. *F02D 23/00* (2013.01); *Y02T 10/121* (2013.01); *Y02T 10/144* (2013.01); *Y02T 10/16* (2013.01)

(58) Field of Classification Search
CPC ............ Y02T 10/144; F02M 25/0707; F02M 25/0711; F02M 25/071; F02M 25/0709; F02M 25/0712; F02D 41/0065; F02D 41/0072
USPC ................... 60/605.2, 612; 123/562, 568.11; 422/105
See application file for complete search history.

(56) References Cited

U.S. PATENT DOCUMENTS

| | | | |
|---|---|---|---|
| 7,165,403 B2 | 1/2007 | Sun et al. | |
| 7,757,549 B2 | 7/2010 | Andreae et al. | |
| 8,567,192 B2 * | 10/2013 | Chi et al. | 60/612 |
| 8,706,386 B2 * | 4/2014 | Kurtz | 701/109 |
| 2009/0255517 A1 * | 10/2009 | Ishikawa et al. | 123/562 |
| 2012/0014838 A1 * | 1/2012 | Yasui et al. | 422/105 |

* cited by examiner

*Primary Examiner* — Thomas Denion
*Assistant Examiner* — Thomas Olszewski
(74) *Attorney, Agent, or Firm* — GE Global Patent Operation; John A. Kramer

(57) ABSTRACT

Various methods and systems are provided for regulating air flow through a two-stage turbocharger. In one embodiment, a method for an engine comprises, in response to a transient engine operating event, adjusting a provided amount of exhaust gas recirculation provided to an intake of the engine based on at least one of desired intake oxygen, one or more turbocharger conditions of a turbocharger, or a magnitude of the transient engine operating event.

12 Claims, 6 Drawing Sheets

METHODS AND SYSTEM FOR CONTROL OF A TWO-STAGE TURBOCHARGER

FIELD

Embodiments of the subject matter disclosed herein relate to an engine, engine components, and an engine system, for example.

BACKGROUND

Turbocharging an engine allows the engine to provide power similar to that of a larger displacement engine. Thus, turbocharging can extend the operating region of an engine. Turbochargers function by compressing intake air in a compressor via a turbine operated by exhaust gas flow. Under certain conditions, the flow rate and pressure ratio across the turbocharger can fluctuate to levels that may result in noise disturbances, and in more severe cases, performance issues and compressor or turbine degradation.

Such turbocharger performance issues may be mitigated by adjusting the flow rate through the turbocharger, such as by adjusting one or more turbocharger bypass valves. However, such adjustments may not provide adequate avoidance of the flow rate/pressure ratio fluctuations, or may compromise power, fuel economy, and/or emissions.

BRIEF DESCRIPTION

In one embodiment, a method for an engine comprises, in response to a transient engine operating event, adjusting a provided amount of exhaust gas recirculation provided to an intake of the engine based on at least one of desired intake oxygen, one or more turbocharger conditions of a turbocharger, or a magnitude of the transient engine operating event.

In this way, the amount of exhaust gas recirculation provided to the intake may be adjusted during a transient event to maintain optimal air flow through the turbocharger while still accounting for the desired intake oxygen amount to control emissions. In one example, the transient event may be an increase in engine load, and the amount of exhaust gas recirculation provided to the intake may be increased in order to lower the mass air flow through the turbocharger and avoid turbocharger choke.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments for regulating air flow through a two-stage turbocharger. During transient events, sudden changes in engine speed and load may result in air flow fluctuations. During an increase in engine load, for example, the amount of exhaust gas recirculated back to the intake may decrease, thus subjecting the turbocharger to additional air flow beyond the tolerance of the turbocharger. Such turbocharger over speed events, also referred to as turbocharger choke, may cause degradation to the turbocharger. To avoid turbocharger choke during a transient event, exhaust gas recirculation (EGR) to the intake of the engine may be adjusted in order to change the mass air flow through the turbocharger. For example, the EGR may be increased to decrease the turbocharger mass air flow. The adjustment to the provided EGR amount to provide optimal turbocharger air flow may be balanced with an EGR amount that maintains exhaust emissions at a desirable level. In this way, turbocharger over speed may be avoided during transient events.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a locomotive is provided as an example of a mobile platform supporting a system incorporating an embodiment of the invention.

Figure 1:
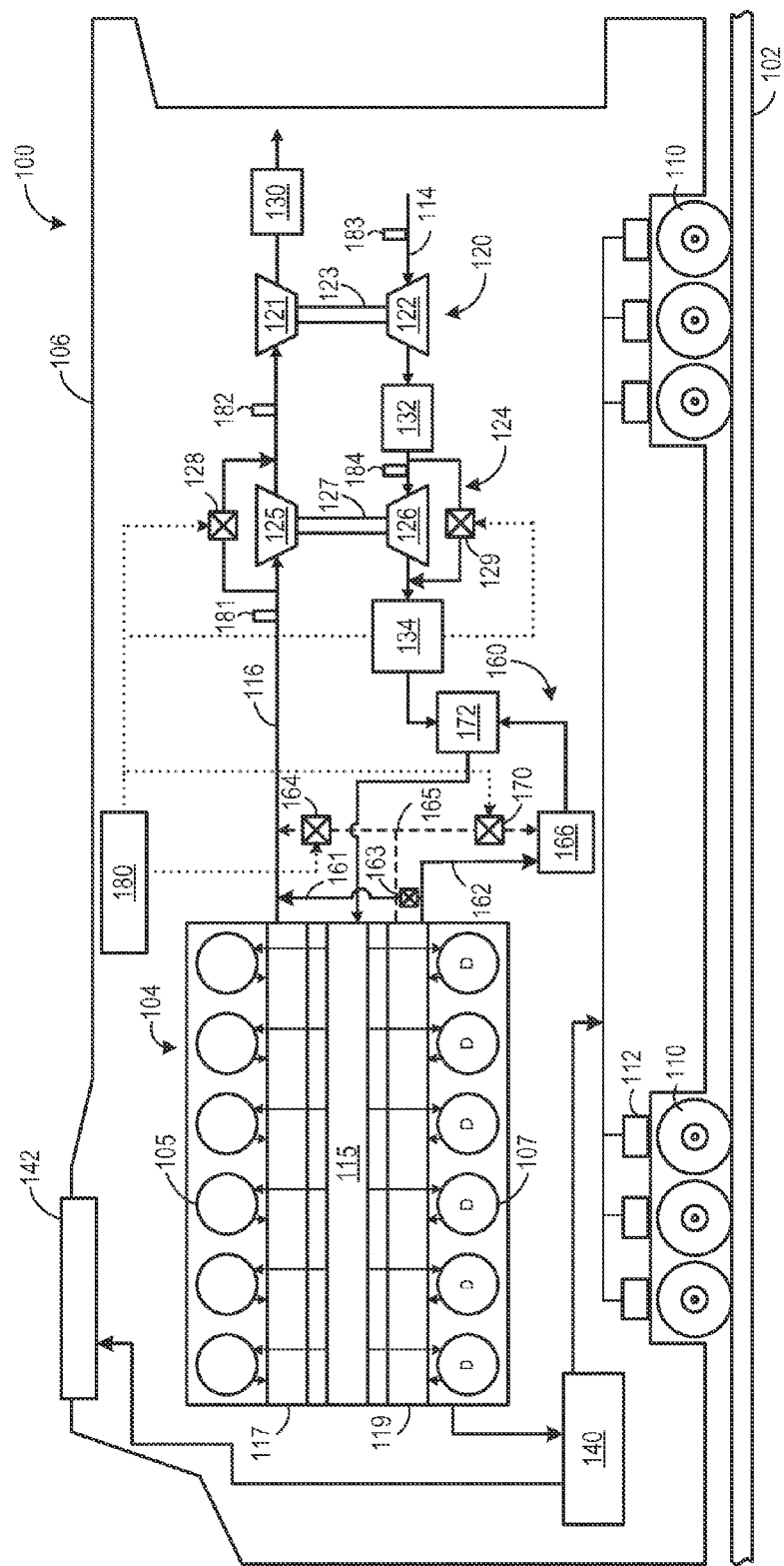
FIG. 1 shows a schematic diagram of a rail vehicle with an engine according to an embodiment of the invention.

Before further discussion of the approach for regulating turbocharger air flow, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle 106 includes an engine 104. In other non-limiting embodiments, the engine 104 may be a stationary engine, such as in a power-plant application, or an engine in a marine vessel or off-highway vehicle propulsion system as noted above.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the alternator/generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust passage 116 to route exhaust gas from the engine to atmosphere (after it passes through an exhaust gas treatment system 130 and first and second turbochargers 120 and 124). The donor cylinders 107, which provide engine exhaust gas recirculation (EGR), are coupled exclusively to an EGR passage 162 of an EGR system 160 which routes exhaust gas from the donor cylinders 107 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$).

Exhaust gas flowing from the donor cylinders 107 to the intake passage 114 passes through a heat exchanger such as an EGR cooler 166 to reduce a temperature of (e.g., cool) the exhaust gas before the exhaust gas returns to the intake passage. The EGR cooler 166 may be an air-to-liquid heat exchanger, for example. In such an example, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Additionally, in some embodiments, the EGR system 160 may include an EGR bypass passage 161 that is configured to divert exhaust from the donor cylinders back to the exhaust passage. The EGR bypass passage 161 may be controlled via a valve 163. The valve 163 may be configured with a plurality of restriction points such that a variable amount of exhaust is routed to the exhaust, in order to provide a variable amount of EGR to the intake.

In an alternate embodiment shown in FIG. 1, the donor cylinders 107 may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler 166 and/or additional elements prior to being routed to the intake passage 114. Further, the alternate EGR system includes a first valve 164 disposed between the exhaust passage 116 and the alternate EGR passage 165.

The first valve 164 and second valve 170 may be on/off valves controlled by the control unit 180 (for turning the flow of EGR on or off), or they may control a variable amount of EGR, for example. In some examples, the first valve 164 may be actuated such that an EGR amount is reduced (exhaust gas flows from the EGR passage 165 to the exhaust passage 116). In other examples, the first valve 164 may be actuated such that the EGR amount is increased (e.g., exhaust gas flows from the exhaust passage 116 to the EGR passage 165). In some embodiments, the alternate EGR system may include a plurality of EGR valves or other flow control elements to control the amount of EGR.

In such a configuration, the first valve 164 is operable to route exhaust from the donor cylinders to the exhaust passage 116 of the engine 104 and the second valve 170 is operable to route exhaust from the donor cylinders to the intake passage 114 of the engine 104. As such, the first valve 164 may be referred to as an EGR bypass valve, while the second valve 170 may be referred to as an EGR metering valve. In the embodiment shown in FIG. 1, the first valve 164 and the second valve 170 may be engine oil, or hydraulically, actuated valves, for example, with a shuttle valve (not shown) to modulate the engine oil. In some examples, the valves may be actuated such that one of the first and second valves 164 and 170 is normally open and the other is normally closed. In other examples, the first and second valves 164 and 170 may be pneumatic valves, electric valves, or another suitable valve.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the vehicle system 100 may additionally or alternatively include a low-pressure EGR system which routes exhaust gas from downstream of the turbochargers 120 and 124 in the exhaust passage 116 to a location upstream of the turbochargers 120 and 124 in the intake passage 114.

As depicted in FIG. 1, the vehicle system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The first turbocharger may be referred to the "low-pressure stage" of the turbocharger. The second turbocharger 124 operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger 124 is provided with a turbine bypass valve 128 which allows exhaust gas to bypass the second turbocharger 124. The turbine bypass valve 128 may be opened, for example, to divert the exhaust gas flow away from the second turbine 125. In this manner, the rotating speed of the compressor 126, and thus the boost provided by the turbochargers 120, 124 to the engine 104 may be regulated during steady state conditions. Additionally, the first turbocharger 120 may also be provided with a turbine bypass valve. In other embodiments, only the first turbocharger 120 may be provided with a turbine bypass valve, or only the second turbocharger 124 may be provided with a turbine bypass valve. Additionally, the second turbocharger may be provided with a compressor bypass valve 129, which allows gas to bypass the second compressor 126 to avoid compressor surge, for example. In some embodiments, first turbocharger 120 may also be provided with a compressor bypass valve, while in other embodiments, only first turbocharger 120 may be provided with a compressor bypass valve.

According to embodiments disclosed herein, the air flow through the first and second turbochargers may be regulated to avoid turbocharger choke during a transient event. The air flow through the first and second turbochargers may be controlled by adjusting the amount of EGR routed to the intake. For example, if the amount of air flow through the two-stage turbocharger exceeds a choke limit for one or both of the stages of the turbocharger, the air flow may be reduced by increasing EGR flow to the intake. Conversely, if the amount of air flow through the turbocharger is lower than optimal for performance, or is below a surge limit, the air flow may be increased by reducing the EGR flow to the intake. The EGR may be adjusted based on a trajectory of EGR amounts that maintain mass air flow through the turbocharger below respective over speed lines (over speed levels) for a plurality of pressure ratios and turbocharger speeds for each stage of the turbocharger. Additional detail regarding adjusting the EGR flow to maintain desired turbocharger air flow will be presented below with respect to FIGS. 2-6.

The vehicle system 100 further includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The vehicle system 100 further includes the control unit 180, which is provided and configured to control various components related to the vehicle system 100. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, exhaust temperature, exhaust pressure, etc. Correspondingly, the control unit 180 may control the vehicle system 100 by sending commands to various components such as traction motors, alternator, cylinder valves, throttle, heat exchangers, wastegates or other valves or flow control elements, etc.

Thus, the vehicle system of FIG. 1 may provide for an engine system comprising a two-staged turbocharger, an EGR system including a first EGR valve and a second EGR valve, and a control unit including instructions to, during steady state conditions, adjust the first and second EGR valves to deliver a first amount of EGR based on intake oxygen, and in response to a detected transient operating event, adjust the first and second EGR valves to deliver a second amount of EGR based on intake oxygen, desired mass air flow through the two-stage turbocharger, and a magnitude of the transient operating event.

The desired mass air flow through the two-stage turbocharger may be based on a pressure ratio and speed of a first stage of the two-stage turbocharger and a pressure ratio and speed of a second stage of the two-stage turbocharger. Additionally or alternatively, the desired mass air flow through the two-stage turbocharger may be further based on a position of a first bypass valve of the first stage and/or a position of a second bypass valve of the second stage.

The second amount of EGR may be within a range of a third EGR amount that provides a designated intake oxygen concentration and a fourth EGR amount that provides the designated mass air flow through the two-stage turbocharger, and may be selected from within the range based on the magnitude of the transient operating event.

Thus, according the above-described system, the provided amount of EGR may be a function of different operating parameters during different operating conditions of the engine. During steady state conditions, the provided EGR amount may be a function of a designated intake oxygen concentration. However, during a transient operating event, such as an increase in load, the provided EGR amount may be a function of both the designated intake oxygen concentration and a designated mass air flow through a turbocharger. During the transient event, the provided amount of EGR may selected from within a range defined by the designated intake concentration and the designated mass air flow through the turbocharger based on a magnitude of the transient event.

Figure 2:
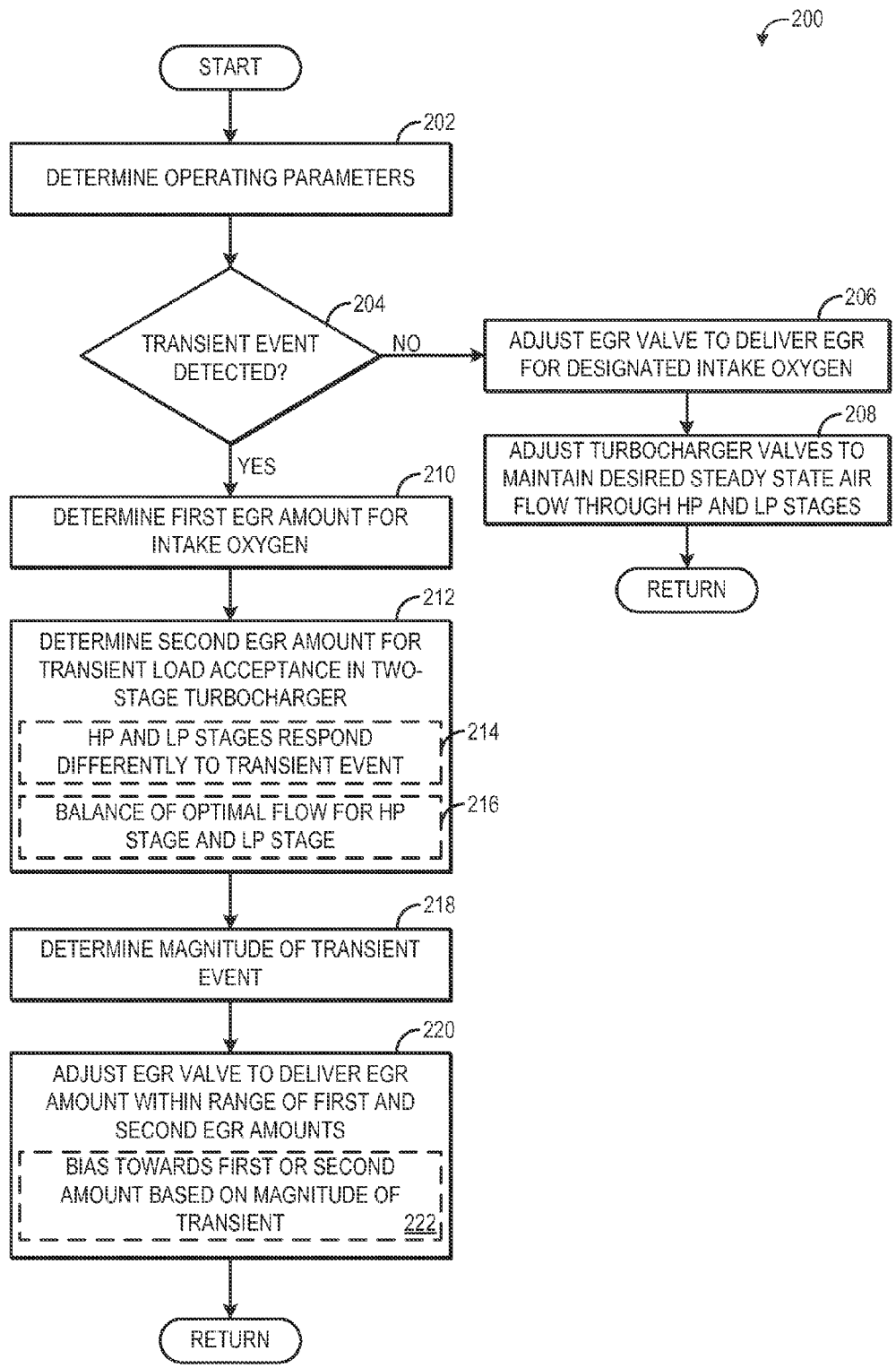
FIG. 2 is a flow chart illustrating a method for controlling an exhaust gas recirculation amount according to an embodiment of the invention.

FIG. 2 is a flow chart illustrating a method 200 for regulating air flow through a turbocharger during a transient event. Method 200 may be carried by an engine control unit, such as control unit 180, according to instructions stored thereon. Method 200 may be executed in order to regulate air flow through a multi-stage turbocharger, including at least two turbochargers, such as first turbocharger 120 and second turbocharger 124. At 202, method 200 includes determining engine operating parameters. The engine operating parameters may include engine speed, load, oxygen-fuel ratio (OFR), temperature, and other parameters. Based on the determined parameters, at 204, it is determined if the engine is operating with a transient event. A transient event may include a sudden increase or decrease in engine speed and load, and may be detected based on engine speed and OFR, or other parameters.

Figure 3:
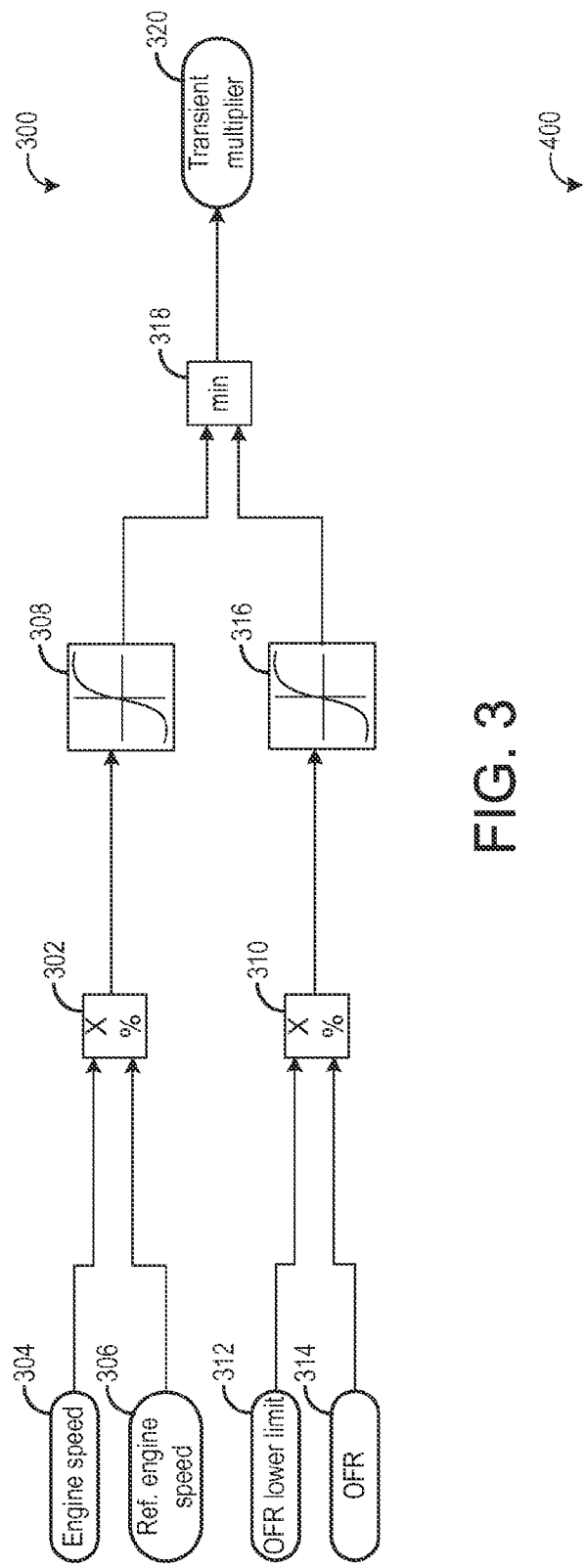
FIG. 3 is a diagram illustrating a control routine for determining the magnitude of a transient event according to an embodiment of the invention.

FIG. 3 is a diagram illustrating an embodiment of a control routine 300 that may be carried out by the control unit for determining a transient event and assigning a magnitude value to the transient event. The transient event may be detected by comparing engine speed to a reference engine speed, and additionally or alternatively by comparing OFR to an OFR lower limit. By doing so, the engine's demand for fresh air, which if it deviates from an expected value indicates a transient operating event, may be monitored.

At 302, the current engine speed 304 may be divided by a reference engine speed 306 to determine an engine speed ratio. The reference engine speed may be a previously determined engine speed, for example the average engine speed during a previous steady state operating event. In other embodiments, the reference engine speed may be an expected speed based on current operating conditions, such as an amount of fuel delivered to the engine, engine load, manifold air pressure, etc. The engine speed ratio is fed into an engine speed look-up table 308. The look-up table may assign a transient magnitude value based on the magnitude of the engine speed ratio. For example, as the current engine speed 304 increases above the reference engine speed 306, the value assigned by the look-up table may increase. In one example, the transient magnitude value may be within a range of 0-1.

Similarly, at 310, a reference OFR lower limit 312 is divided by the current OFR 314, and this OFR ratio is fed into an OFR look-up table 316. The look-up table may assign a transient magnitude value based on the magnitude of the OFR ratio. For example, as the OFR increases above the OFR lower limit, the ratio may become smaller, and the transient magnitude value may increase. However, the above described examples are non-limiting, and the values assigned by the engine speed look-up table 308 and the OFR look-up table 316 may be based on any relationship of the determined ratios.

At 318, the transient magnitude value determined from the look-up table 308 and the transient magnitude value determined from the look-up table 316 are compared, and the minimum value between the two is output as the transient multiplier 320.

Thus, control routine 300 assigns a magnitude value to a transient event, which may be determined based on engine speed and/or OFR. In some embodiments, if the magnitude value assigned to the transient event is below a threshold, then it may be determined that no transient event occurred, and that the engine is operating under steady state conditions. Therefore, returning to FIG. 2, a transient event may be detected if the magnitude value determined by control routine 300 is above a threshold. Other mechanisms for determining a transient event are also possible, such as comparing current engine speed and load to a rolling average of engine speed and load.

If a transient event is not detected, method 200 proceeds to 206 to adjust the EGR system valve to deliver an EGR amount for designated intake oxygen concentration. The designated intake oxygen concentration may be an amount of intake oxygen that provides desired combustion conditions, and hence may be based on engine speed and load. Additionally, the designated intake oxygen amount may balance reduction of exhaust constituent emissions, such as NOx emissions, with production of particulate matter. The amount of EGR routed to the intake impacts the intake oxygen concentration, due to the EGR, which is low in oxygen, occupying volume otherwise taken up by intake air, which is relatively high in oxygen. Thus, as the EGR amount increases, the intake oxygen concentration decreases. The designated intake oxygen concentration, and hence the designated amount of EGR to deliver the designated intake oxygen, may be a function of engine speed, load, OFR, exhaust oxygen fraction, manifold air pressure, manifold air temperature, combustion stability such as an amount of knock, and/or additional parameters. The EGR valve, which may include valve 163, or in alternate embodiments, the EGR metering valve 170 and EGR bypass valve 164, may be set to a desired position to deliver the EGR amount from the donor cylinders to the intake.

At 208, one or more turbocharger valves may be adjusted to maintain optimal air flow through both the high-pressure stage and the low-pressure stage of the turbocharger. The optimal air flow through the turbocharger may be based on a desired amount of boost to be provided to the intake. Additionally, the air flow through the turbocharger may be maintained under an over speed limit and/or may be adjusted to maintain a desired pressure ratio across the turbocharger turbine and compressor. The turbocharger valves may include a high-pressure turbine bypass valve (e.g., valve 128), high-pressure compressor bypass valve (e.g., valve 129), and/or additional turbocharger valves. Method 200 then returns.

Returning to 204 of FIG. 2, if it is determined that the engine is operating with a transient event, for example if the transient magnitude value is above a threshold, method 200 proceeds to 210 to determine a first EGR amount for designated intake oxygen concentration. The first EGR amount may be determined similarly to the EGR amount for designated intake oxygen determined at 206. At 212, a second EGR amount for transient load acceptance in the multi-stage turbocharger is determined. During a transient increase in engine load, when mass air flow through the engine and hence mass air flow through the turbocharger increases, the turbocharger may be subject to air flow amounts above an over speed/choke limit. To reduce the air flow through the turbocharger, EGR may be increased. As indicated at 214, the high-pressure stage and the low-pressure stage of the multi-stage turbocharger each respond differently to transient events. As demonstrated in examples of turbocharger flow maps for the high-pressure stage and low pressure stage illustrated in FIGS. 7 and 8, while each stage of the turbocharger may experience the same transient event, the high-pressure stage responds differently to the transient event than the low-pressure stage. Therefore, the maximum air flow without experiencing choke for each stage may be determined based on measured turbocharger conditions, and as indicated at 216, the second amount of EGR may be selected in order to balance optimal flow through both stages and compensate for the difference in the transient responses between the two stages. The maximum air flow allowable without experiencing choke in both the high-pressure and low-pressure stages of the turbocharger may be determined based on determined turbocharger conditions according to the control routines illustrated in FIGS. 4 and 5, which are be presented below. Additional information with respect to the exemplary turbocharger flow maps illustrated in FIGS. 7 and 8 will also be presented below.

At 218, the magnitude of the transient event is determined. The magnitude of the transient event may be the transient multiplier value output by control routine 300 described above. At 220, the EGR valve (such as valve 163 or in other embodiments valves 164 and 170) is adjusted to deliver an EGR amount to the intake that is within a range defined by the first and second EGR amounts. Adjusting the EGR valve may include biasing the EGR amount towards the first or second amount based on the magnitude of the transient event at 222. The amount of EGR actually delivered to the intake may be based on both the first amount of EGR for providing desired intake oxygen, and the second amount of EGR for providing maximum turbocharger air flow. Depending on the magnitude of the transient event, the actual amount of delivered EGR may be within the range of the first and second amounts of EGR, but biased toward delivering a designated intake oxygen amount, for example if the transient event is relatively small, or toward delivering the maximum turbocharger air flow, for example if the transient event is relatively large. The amount of EGR delivered to the intake may provide desired turbocharger performance while balancing combustion stability and emission reduction. Desired turbocharger performance may include avoiding turbocharger choke and surge while maintaining air flow through the turbocharger in or near a region of relatively high efficiency. To determine the amount of EGR to deliver to the intake based on desired oxygen, turbocharger air flow, and the transient event, the control routine depicted in FIG. 6, explained below, may be carried out. Method 200 then returns.

Thus, method 200 provides for a method for an engine. The method includes, based on a magnitude of a transient operating event, biasing an amount of EGR provided to an intake of the engine toward a first EGR amount that provides designated intake oxygen or toward a second EGR amount that provides designated mass air flow for turbocharger performance. The designated mass air flow for turbocharger performance may be a mass air flow for avoiding surge and choke of the turbocharger. The method may also include, if the magnitude of the transient operating event is above a threshold, then biasing toward the second EGR amount, and if the magnitude of the transient operating event is below the threshold, then biasing toward the first EGR amount. The biasing toward the first or second amount of EGR may include adjusting one or more EGR valves in order to deliver an amount of EGR to the intake that is within a range of the first and second amounts. The actual amount of delivered EGR may be biased toward the first EGR amount or toward the second EGR amount based on the magnitude of the transient event, which may be determined based on a difference between a reference OFR and a measured OFR, or between a reference engine speed and a measured engine speed.

The turbocharger may be a two-stage turbocharger, and the designated mass air flow for performance of the two-stage turbocharger may be within a range of a first amount of mass air flow for performance of a first stage of the two-stage turbocharger and a second amount of mass air flow for performance of a second stage of the two-stage turbocharger. The first and second amounts of mass air flow for turbocharger performance may be based on a speed and upstream temperature and pressure of the respective turbocharger stages. The first and second amounts of mass air flow for turbocharger performance may further be based on the transient event response for each respective stage.

Figure 4:
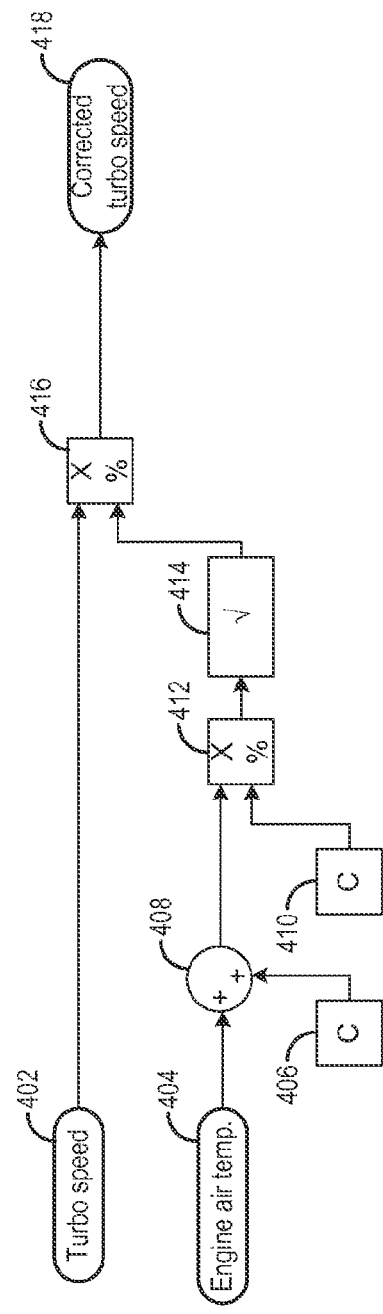
FIG. 4 is a diagram illustrating a control routine for correcting a turbocharger speed according to an embodiment of the invention.
Figure 5:
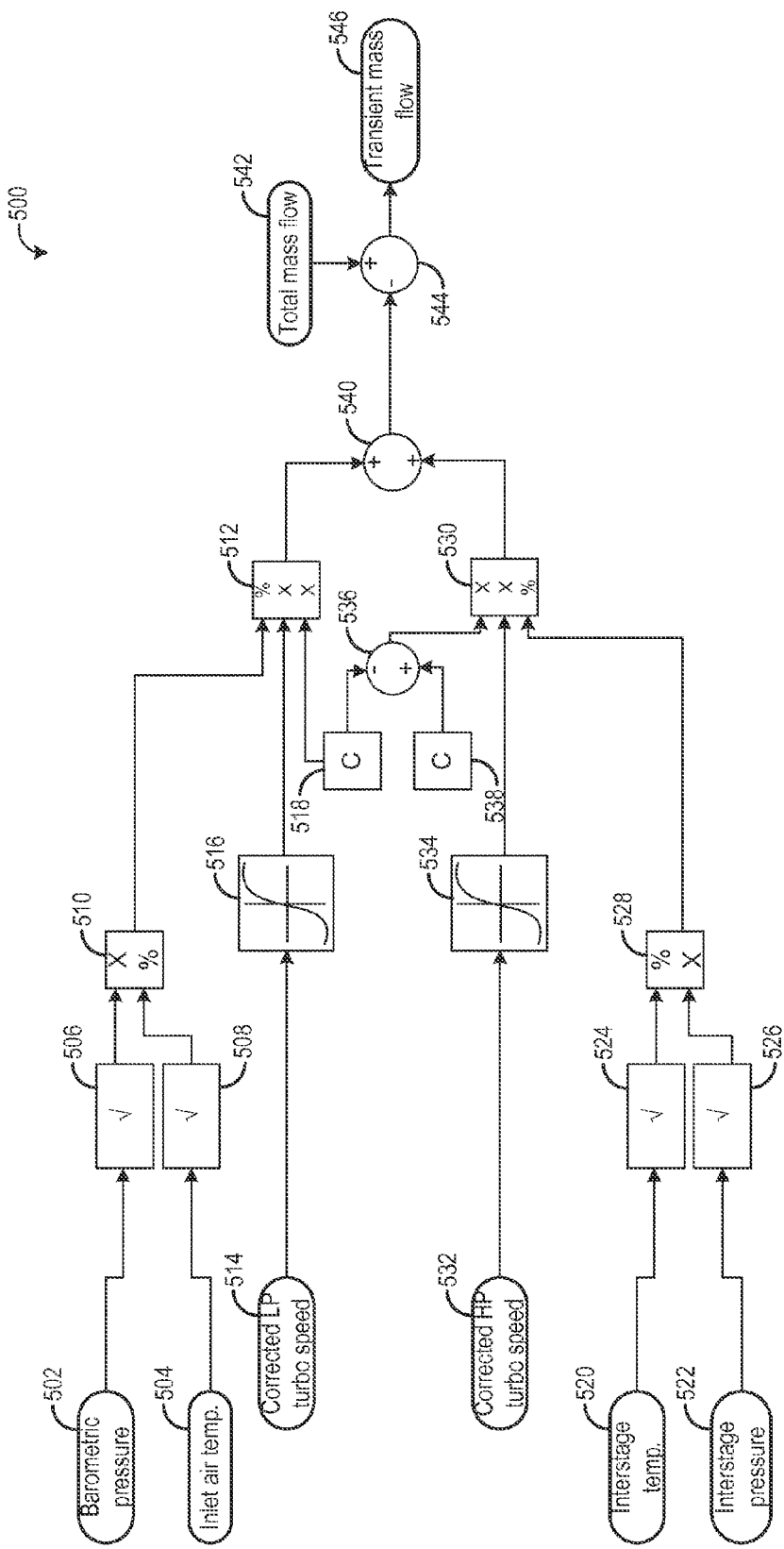
FIG. 5 is a diagram illustrating a control routine for determining an optimal air flow amount through two stages of a turbocharger according to an embodiment of the invention.

FIGS. 4 and 5 illustrate embodiments of control routines for determining optimal air flow through both a high-pressure stage and a low-pressure stage of a two-stage turbocharger. Similar routines may be carried out on any multi-stage turbocharger configuration. The optimal air flow through the turbocharger may be based on turbocharger speed. However, the measured turbocharger speed may be corrected based on an air temperature in order to account for changes in the air density due to temperature.

FIG. 4 is a diagram illustrating a control routine 400 for correcting a turbocharger speed, according to an embodiment. Control routine 400 may correct a measured turbocharger speed for a low-pressure stage or for a high-pressure stage. As explained above, the turbocharger speed 402 is corrected based on an engine air temperature 404. The engine air temperature may be ambient temperature, a temperature of the air at the inlet of the turbocharger (for example, if the speed of the low-pressure stage is being determined), or an interstage temperature (if the speed of the high-pressure stage is being determined).

The engine air temperature 404 may be added to a first constant 406 at 408. The first constant 406 may be a value that converts the temperature to a different scale or unit, or may be a temperature offset. This value is then divided by a second constant 410 at 412, and then the square root is determined at 414. The second constant 410 may be a reference temperature value, such as the average operating temperature of that particular stage of the turbocharger. Thus, the air temperature may be transformed into a value that reflects a degree of deviance from a standard turbocharger operating temperature. At 416, the turbocharger speed 402 is divided by the output of 414, and this value is output as the corrected turbocharger speed 418. As a result, the measured turbocharger speed may be revised to be either increased or decreased in order to reflect the temperature of the air flowing through the turbocharger, prior to utilizing the turbocharger speed for subsequent air flow calculations.

FIG. 5 is a diagram illustrating an embodiment of a control routine 500 for determining optimal turbocharger air flow through high- and low-pressure stages of the turbocharger. First, to determine optimal air flow through the low-pressure (LP) stage, the barometric pressure 502 and inlet air temperature 504 are determined. The barometric pressure may include the air pressure outside the vehicle in which the two-stage turbocharger is installed, or the barometric pressure may be the pressure of the air flow at the inlet of the LP stage. At 506, the square root of the barometric pressure is taken, and at 508 the square root of the inlet air temperature is taken. The value output from 506 (the square root of the barometric pressure) is then divided by the square root of the inlet air temperature (output from 508) at 510. A product of this first value and two additional values, explained below, is determined at 512. The second value is based on the corrected LP turbo speed 514, which may be determined based on the control routine 400 described above with respect to FIG. 4. The corrected LP turbocharger speed is entered into a look-up table 516, which outputs an optimal air flow amount for that turbocharger speed. The look-up table 516 may be based on the exemplary turbocharger flow map illustrated in FIG. 8, for example, and the optimal air flow amount determined from the look-up table may reflect an air flow amount that is outside a choke region and a surge region and/or provides desired turbocharger efficiency. Additionally, the optimal air flow amount for the LP turbocharger may be based on the pressure ratio across the turbocharger.

The third value may reflect the current turbocharger stage bias. A stage bias value 518 may reflect the position of a high-pressure turbine bypass valve, for example, and the relative amount of high-pressure air that is reaching the high-pressure turbine vs. the low-pressure turbine.

At 512, the optimal air flow determined from the look-up table 516 is multiplied by the stage bias value 518, and this product is divided by the ratio of the barometric pressure to the inlet temperature, output from 510, to determine a final air flow amount for providing optimal low-pressure flow.

Optimal flow for the high-pressure stage may be determined in a similar manner. The square root of the interstage temperature 520 and interstage pressure 522 may each be determined at 524 and 526. The interstage temperature and pressure may be measured between the low-pressure turbocharger and the high-pressure turbocharger. The square root of the interstage pressure may be divided by the square root of the interstage temperature at 528 to determine a pressure to temperature ratio. The corrected high-pressure (HP) turbocharger speed 532, determined by the control routine 400, may be entered into look-up table 534 to determine an optimal air flow amount for the HP stage, similar to the mechanism by which the optimal air flow through the LP stage was determined. For example, the optimal air flow through the HP stage may be based on corrected HP turbocharger speed and turbocharger pressure ratio, and may be an air flow amount above a surge line but below an over speed or choke line. The look-up table may be based on the example turbocharger flow map illustrated in FIG. 7, and as such the optimal air flow for the high-pressure stage may be different than the optimal air flow for the low-pressure stage.

This value may be multiplied by a second stage bias value at 530. The second stage bias value may be determined by subtracting the stage bias value 518 from a constant 538 at 536. In one example, the stage bias value 518 may be on a scale of 0-1, and the constant 538 may be 1. In this way, if for example the stage bias value 518 is 0.3, the second stage bias value may be 0.7, and this may reflect the relative proportion of the high-pressure air flow that is reaching the low-pressure stage and the relative proportion that is reaching the high-pressure stage.

Further, at 530, the above calculated product may be divided by the interstage temperature/pressure ratio to output a final high-pressure optimal air flow amount. The final low-pressure optimal air flow amount, output from 512, and the final high-pressure optimal air flow amount output from 530, may be summed at 540. Thus, the mass air flow for optimal turbocharger performance during the transient event may be determined based on a balance between the optimal mass air flows for each stage of the turbocharger. During an increase in load, the optimal turbocharger mass air flow may be the maximum air flow through the turbocharger before a choke event occurs. The second EGR amount that provides the maximum turbocharger air flow, described above with respect to FIG. 2, may be the amount of EGR that reduces the mass air flow through the turbocharger to the maximum amount. To determine the EGR amount for providing optimal turbocharger air flow, at 544, the value output from 540 may be subtracted from the total mass flow 542 currently flowing through the turbocharger to determine an EGR mass flow for the transient event at 546.

Figure 6:
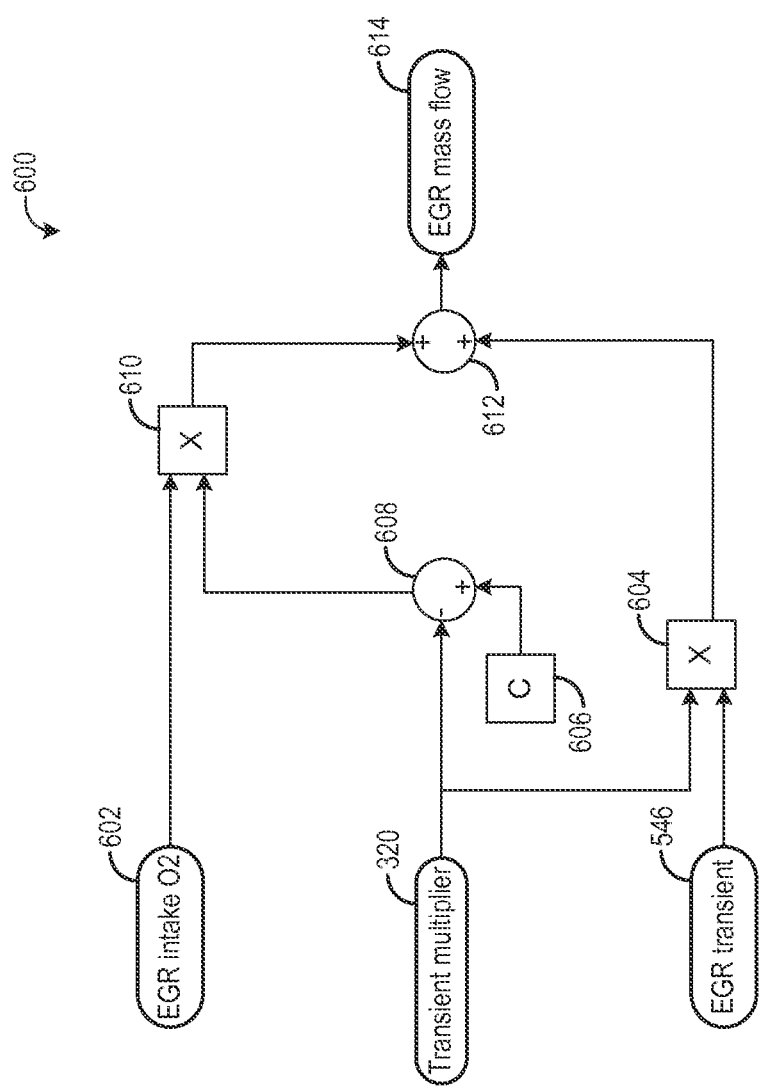
FIG. 6 is a diagram illustrating a control routine for determining an amount of EGR according to an embodiment of the invention.

Turning to FIG. 6, a diagram illustrating an embodiment of a control routine 600 for determining an amount of EGR provided to the intake is illustrated. Control routine 600 utilizes the first EGR amount for providing desired intake oxygen 602, determined based on operating parameters as described above with respect to FIG. 2, the second EGR amount for providing optimal or maximum turbocharger air flow during the transient 546, as determined based on the control routine 500 of FIG. 5, and the transient multiplier 320 determined by control routine 300 of FIG. 3. The transient multiplier 320 is multiplied by the EGR for transient load acceptance 546 at 604 to determine a final EGR flow amount for transient load acceptance. The transient multiplier 320 is also subtracted from a constant 606 at 608. Similar to the stage bias described above, the transient multiplier may be on a scale of 0-1, and the constant may be 1. At 610, the value output from 608 may be multiplied by the EGR for designated intake oxygen concentration 602 to determine a final EGR flow amount for designated intake oxygen concentration. The two final EGR values are summed at 612 to determine the actual EGR amount mass flow amount 614.

Thus, the control routine 600 selects an EGR amount within a range of a first possible EGR amount that provides desired intake oxygen and a second possible EGR amount that provides optimal turbocharger air flow for accepting the transient load. Depending on the magnitude of the transient event, the selected EGR amount may be closer to the first amount or closer to the second amount. As the magnitude of the transient event increases, higher weight may be given to the second EGR amount for the turbocharger flow in order to control the transient air flow and avoid turbocharger choke, even if the designated intake oxygen concentration is not provided. As the magnitude of the transient event decreases, higher weight may be given to the first EGR amount for the designated intake oxygen. Because the magnitude of the transient event is small, there is a lower chance for turbocharger choke, and thus the EGR amount may be based mostly on designated intake oxygen concentration for controlling exhaust emissions.

Figure 7:
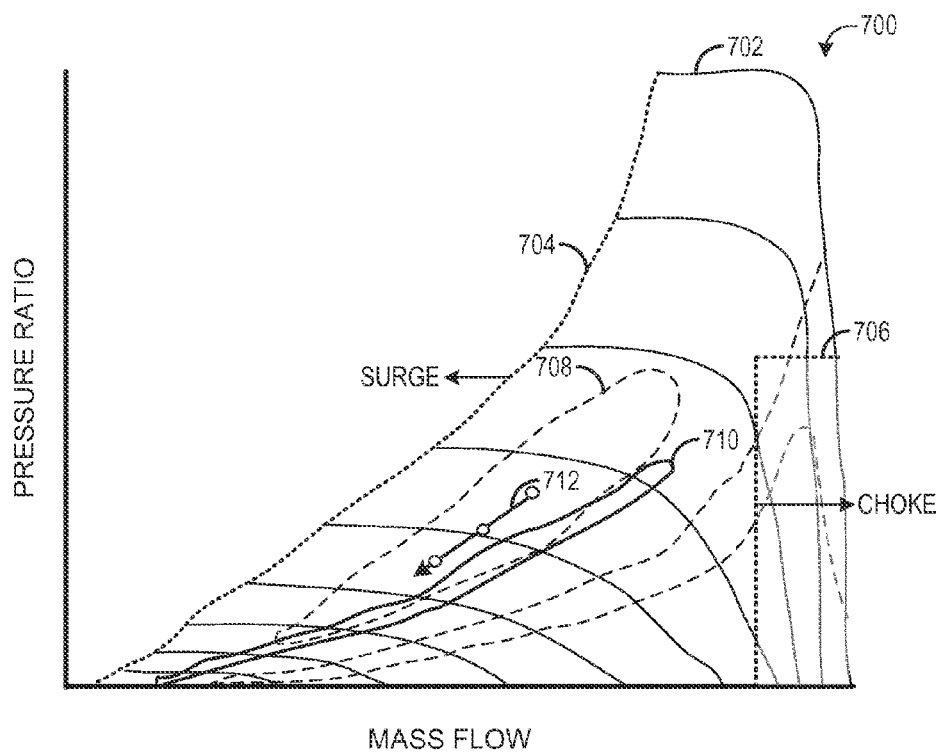
FIG. 7 is a turbocharger flow map for a high-pressure turbocharger according to an embodiment of the present invention.
Figure 8:
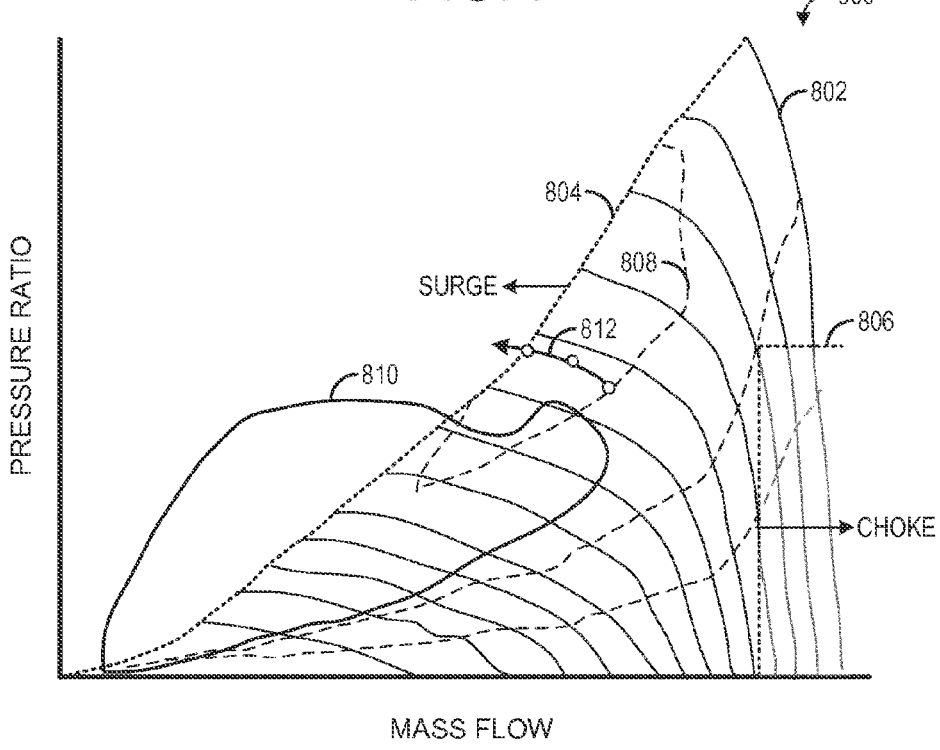
FIG. 8 is a turbocharger flow map for a low-pressure turbocharger according to an embodiment of the present invention.

FIGS. 7 and 8 are exemplary turbocharger maps for a high-pressure stage and a low-pressure stage of a two-stage turbocharger that illustrate the differential response to transient events between the two stages. FIG. 7 illustrates a map 700 for a high-pressure stage, and FIG. 8 illustrates a map 800 for a low-pressure stage. For both maps 700 and 800, the pressure ratio across the respective turbocharger is depicted on the vertical axis, while the mass flow through the respective turbocharger is depicted on the horizontal axis.

Referring now to FIG. 7, map 700 includes a plurality of turbocharger speed lines, for example speed line 702, which are illustrated in solid lines. For each respective speed line, optimal air flow for the high-pressure stage may be to the right of the surge line 704 and to the left of the choke region 706. Within the region of optimal air flow, there are zones of increasing efficiency illustrated by the dashed lines; zone 708 is an example of a highest efficiency zone. Thus, air flow through the high-pressure stage may be controlled to maintain the stage within the high-efficiency zone 708.

However, during a transient event, such as a drop in engine load, the turbocharger may respond by operating within transient zone 710. As illustrated in FIG. 7, the transient zone 710 for the high-pressure stage is within the boundaries of the surge line 704 and the choke region 706. Also illustrated in FIG. 7 is an example response to the high-pressure turbine bypass valve being opened. As the turbine bypass valve redirects air flow around the high-pressure stage, the high-pressure stage responds with decreasing mass flow and a decreased pressure ratio, shown by line 712.

In contrast, the low-pressure stage responds differently to a transient event than the high-pressure stage. Map 800 of FIG. 8 includes a plurality of turbocharger speed lines 802, a surge line 804, and choke region 806, similar to the high-pressure map 700. Map 800 also includes zones of varying efficiency, such as high-efficiency zone 808. The efficiency zones of the low-pressure map as well as the surge line 804 are different in the low-pressure map as compared to the high-pressure map.

Furthermore, in response to a transient drop in engine load (and further in response to the change in EGR flow amounts that may accompany the transient event), the low-pressure stage operates within transient zone 810, which as illustrated in FIG. 8 includes area to the left of the surge line 804. Furthermore, an example response to the turbine bypass valve of the high-pressure stage being opened is also illustrated in FIG. 8. Unlike the response illustrated by line 712 of FIG. 7, the low-pressure stage is pushed towards the surge line as the turbine bypass valve of the high-pressure stage is opened, as illustrated by line 812.

Thus, the low-pressure turbocharger may operate under surge conditions during a transient drop in load. Additionally, by opening the turbine bypass valve of the high-pressure turbocharger, the low-pressure turbocharger may be pushed to operate under surge conditions. While FIGS. 7 and 8 illustrate a response to a drop in load, an increase in load may also affect the high-pressure turbocharger and the low-pressure turbocharger differentially. For example, in response to an increase in engine load, the low-pressure stage may be pushed across the boundary into the choke region, while the high-pressure stage may continue to operate outside of the choke region. Therefore, the optimal air flow amounts for each stage may be different.

During a transient increase in engine load, for example, typically the amount of EGR routed to the intake of the engine may be reduced. As demonstrated above, the low-pressure turbocharger and the high-pressure turbocharger may respond differentially to this transient event. Thus, to prevent the low-pressure turbocharger from operating within the choke region described above, the amount of EGR routed to the intake may be adjusted. In one example, depending on turbocharger conditions including temperature, speed, pressure ratio, and mass air flow, an EGR amount may be selected from a trajectory of EGR amounts that are aligned substantially parallel to a choke or over speed line of the low-pressure turbocharger. These EGR amounts may maintain the turbocharger below the choke line for a given turbocharger pressure ratio and mass air flow. In another example, the EGR amount routed to the intake may be adjusted to provide a balance between a designated intake oxygen concentration that provides stable combustion conditions and controls engine out emissions, and a designated system mass air flow that provides designated flow through both the high-pressure and low-pressure turbochargers. The designated flow may be an amount that avoids choke and surge and/or that maintains relatively high turbocharger efficiency.

Thus, the systems and methods described herein provide for a method for an engine. The method may include in response to a transient engine operating event, adjusting a provided amount of exhaust gas recirculation (EGR) provided to an intake of the engine based on at least one of designated intake oxygen concentration, one or more turbocharger conditions, and a magnitude of the transient engine operating event.

The method may include determining a magnitude of a transient engine operating event based on a change in engine speed or other parameters. The turbocharger conditions may be determined based on information received from one or more sensors. The provided amount of EGR provided to the intake may be adjusted responsive to the transient operating event to provide one or more of a first EGR amount for the designated intake oxygen concentration and a second EGR amount for a designated mass air flow, the designated mass air flow determined based on the turbocharger conditions.

Another embodiment relates to a method for an engine. The method comprises, in response to a transient engine operating event, adjusting a provided amount of exhaust gas recirculation (EGR) provided to an intake of the engine based on at least one of designated intake oxygen concentration, one or more turbocharger conditions of a turbocharger, and/or a magnitude of the transient engine operating event. In another embodiment, the provided amount of EGR is adjusted based on at least two of the designated intake oxygen concentration, the one or more turbocharger conditions of a turbocharger, and/or the magnitude of the transient engine operating event. In another embodiment, the provided amount of EGR is adjusted based on all of the designated intake oxygen concentration, the one or more turbocharger conditions of a turbocharger, and the magnitude of the transient engine operating event.

Another embodiment relates to a method for an engine. The method comprises, in response to a transient engine operating event, adjusting a provided amount of exhaust gas recirculation (EGR) provided to an intake of the engine based on one or more turbocharger conditions of a two-stage turbocharger coupled to the engine and having at least first and second turbocharger stages. (In other embodiments, the provided amount is adjusted further based on designated intake oxygen concentration and/or a magnitude of the transient engine operating event.) The turbocharger conditions comprise one or more of temperature, mass air flow, pressure ratio, speed, or one or more transient responses of the first and second turbocharger stages.

Another embodiment relates to a method for an engine. The method comprises detecting a transient engine operating event based on a difference between engine speed and a reference engine speed. The method further comprises determining a magnitude of the transient engine operating event based on a degree of the difference. The method further comprises, in response to detecting the transient engine operating event, adjusting a provided amount of exhaust gas recirculation (EGR) provided to an intake of the engine based on the magnitude of the transient engine operating event. (In other embodiments, the provided amount is adjusted further based on at least one of designated intake oxygen concentration and/or one or more turbocharger conditions of a turbocharger.)

As explained above, the terms "high pressure" and "low pressure" are relative, meaning that "high" pressure is a pressure higher than a "low" pressure. Conversely, a "low" pressure is a pressure lower than a "high" pressure.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An engine system, comprising:
   an engine;
   a multi-stage turbocharger coupled to the engine;
   an exhaust gas recirculation (EGR) system including a first EGR valve and a second EGR valve; and
   a control unit configured to:
      adjust the first and second EGR valves to deliver a first amount of EGR based on intake oxygen concentration during steady state conditions; and
      adjust the first and second EGR valves in response to a detected transient operating event to deliver a second amount of EGR based on intake oxygen concentration, designated mass air flow through the multi-stage turbocharger, and a magnitude of the transient operating event.

2. The engine system of claim 1, wherein the transient operating event comprises an increase in engine load.

3. The engine system of claim 1, wherein the designated mass air flow through the multi-stage turbocharger is based on a pressure ratio and speed of a first stage of the multi-stage turbocharger and a pressure ratio and speed of a second stage of the multi-stage turbocharger.

4. The engine system of claim 3, wherein the designated mass air flow through the multi-stage turbocharger is further based on a position of a first bypass valve of the first stage and a position of a second bypass valve of the second stage.

5. The engine system of claim 3, wherein the second amount of EGR is within a range defined by a third EGR amount that provides a designated intake oxygen concentration and a fourth EGR amount that provides the designated mass air flow through the multi-stage turbocharger.

6. The engine system of claim 5, wherein the second amount of EGR is selected from within the range based on the magnitude of the transient operating event.

7. A method for an engine system including an engine, a multi-stage turbocharger coupled to the engine, an exhaust gas recirculation (EGR) system including a first EGR valve and a second EGR valve; and a control unit, the method carried out by the control unit and comprising:
   adjusting the first and second EGR valves to deliver a first amount of EGR based on intake oxygen concentration during steady state conditions; and
   adjusting the first and second EGR valves in response to a detected transient operating event to deliver a second amount of EGR based on intake oxygen concentration, designated mass air flow through the multi-stage turbocharger, and a magnitude of the transient operating event.

8. The method of claim 7, wherein adjusting the first and second EGR valves in response to the detected transient operating event comprises adjusting the first and second EGR valves in response to an increase in engine load.

9. The method of claim 7, wherein the designated mass air flow through the multi-stage turbocharger is based on a pressure ratio and speed of a first stage of the multi-stage turbocharger and a pressure ratio and speed of a second stage of the multi-stage turbocharger.

10. The method of claim 9, wherein the designated mass air flow through the multi-stage turbocharger is further based on a position of a first bypass valve of the first stage and a position of a second bypass valve of the second stage.

11. The method of claim 9, wherein the second amount of EGR is within a range defined by a third EGR amount that provides a designated intake oxygen concentration and a fourth EGR amount that provides the designated mass air flow through the multi-stage turbocharger.

12. The method of claim 11, wherein the second amount of EGR is selected from within the range based on the magnitude of the transient operating event.

* * * * *